(12) United States Patent
Hollenbeck et al.

(10) Patent No.: US 7,654,606 B2
(45) Date of Patent: Feb. 2, 2010

(54) CONVERTIBLE VEHICLE COMPRISING A MAIN PILLAR

(75) Inventors: Sven Hollenbeck, Westerkappein (DE); Joachim Maaβ, Bissendorf (DE)

(73) Assignee: Wilhelm Karmann GmbH, Osnabruck (DE)

( * ) Notice: Subject to any disclaimer, the term of this patent is extended or adjusted under 35 U.S.C. 154(b) by 352 days.

(21) Appl. No.: 11/712,275

(22) Filed: Feb. 28, 2007

(65) Prior Publication Data

US 2007/0216191 A1 Sep. 20, 2007

(30) Foreign Application Priority Data

Feb. 28, 2006 (DE) ........................ 10 2006 009 548

(51) Int. Cl.
*B60J 7/00* (2006.01)
(52) U.S. Cl. .................................. 296/122; 296/107.09
(58) Field of Classification Search ............ 296/107.09, 296/121, 108, 107.11, 107.01, 107.12, 117, 296/122
See application file for complete search history.

(56) References Cited

U.S. PATENT DOCUMENTS

| | | | | |
|---|---|---|---|---|
| 3,539,173 A * | 11/1970 | Sampson | .................... | 267/140 |
| 6,302,470 B1 * | 10/2001 | Maass et al. | ........... | 296/107.07 |
| 6,390,530 B1 | 5/2002 | Maass | | |
| 6,422,636 B2 * | 7/2002 | Mentink | ................. | 296/107.01 |
| 6,499,793 B2 * | 12/2002 | Heselhaus et al. | ....... | 296/107.14 |
| 6,692,061 B1 * | 2/2004 | Willard | ....................... | 296/116 |
| 7,243,983 B2 * | 7/2007 | Rashidy et al. | ......... | 296/193.06 |
| 7,517,000 B2 | 4/2009 | Liedmeyer et al. | | |
| 2003/0011208 A1 * | 1/2003 | Tamura et al. | ............... | 296/108 |
| 2004/0012222 A1 * | 1/2004 | Hollenbeck et al. | .... | 296/107.09 |

FOREIGN PATENT DOCUMENTS

| | | |
|---|---|---|
| DE | 19706417 C1 | 7/1998 |
| DE | 19827796 A1 | 1/1999 |
| DE | 29909513 | 9/1999 |
| DE | 19815960 A1 | 10/1999 |
| DE | 10340233 A1 | 4/2005 |

\* cited by examiner

*Primary Examiner*—Patricia L Engle
*Assistant Examiner*—Sunsurraye Westbrook
(74) *Attorney, Agent, or Firm*—Gifford, Krass, Sprinkle, Anderson & Citkowski, P.C.

(57) ABSTRACT

A convertible vehicle comprising a moving roof that includes a main pillar which projects upwardly from a window breast line and is movable rearwardly and downwardly around a bearing on the opening of the roof is configured such that the bearing is transposed upwardly with respect to the closed position at least during a part of the roof opening movement.

19 Claims, 13 Drawing Sheets

CONVERTIBLE VEHICLE COMPRISING A MAIN PILLAR

REFERENCE TO RELATED APPLICATION

This application claims priority to German patent application No. DE 10 2006 009 548.0, filed Feb. 28, 2006, the entire content of which is incorporated herein by reference.

FIELD OF THE INVENTION

The invention relates to a convertible vehicle comprising a movable roof that includes a main pillar which projects upwardly from a window breast line and is movable rearwardly and downwardly on the roof opening.

BACKGROUND OF THE INVENTION

It is known to provide convertible vehicles with a main pillar, that is with a connector which projects upwardly and into an upper roof region from below a window breast line and which stands behind the side windows with the roof closed. A cover material of the roof and a seal line with respect to side windows can be arranged at this main pillar. It can pivot rearwardly and downwardly around a main bearing associated with the car body to open the roof. For visual reasons, the bearing around which the main pillar pivots should be disposed hidden beneath a window breast line. The main pillar can then project upwardly from there, vertically or slopingly up to above the headroom of the occupants, and can extend up to an upper roof region disposed almost horizontally in the closed state.

In this connection, spatial problems can arise in the roof stowage, in particular when the passenger compartment is configured to be relatively long and is, for example, divided at the rear side by a bulkhead partition which comprises a water passage at its marginal region. With the deep stowage of the main pillar in the car body required for a large roof, interference with parts of the car body, for instance with the water passage, can occur during its pivoting. A higher position of the bearing is, however, frequently not possible without this being disposed above the window breast line in a visually irritating manner.

It is the underlying problem of the invention to avoid a risk of collision of the roof on its movement even with difficult spatial conditions.

SUMMARY OF THE INVENTION

According to one aspect of the invention, a convertible vehicle is provided with a moving roof having a main pillar which projects upwardly from a window breast line and is movable rearwardly and downwardly around a bearing on the opening of the roof. The bearing is transposed upwardly with respect to the closed position at least during a part of the roof opening movement.

According to another embodiment of the invention, a convertible vehicle is provided with a roof movable between a closed position extending over a passenger compartment in the vehicle and an open position retracted in a storage space located adjacent the passenger compartment. The roof includes a cover, movable connector, a main pillar and a linkage. The movable connector is coupled to the body of the vehicle for movement about a first pivot. The main pillar supports at least a portion of the cover. The main pillar is pivotally coupled to the movable connector at a second pivot. The movable connector and main pillar are movable about the respective first and second pivots during displacement of the roof between the closed position and the open position. The linkage is operatively coupled between the movable connector and the body of the vehicle to cause the second pivot to move upwardly as the roof moves between the closed position and the open position. The second pivot reaches a highest position while the roof is between the closed position and the open position.

It can be ensured for a generic convertible vehicle using the invention that interference between the car body and a collision of the main pillar in the roof opening movement is avoided by upward transposition of its main bearing even with problematic spatial conditions.

The main pillar can advantageously be provided with a sealing line for the sealing of the closed roof with respect to side windows, with a secure guidance of the main pillar away slopingly upwardly being made possible by the transposition of the bearing supporting the main pillar and with the sealing line being able to come into sealing contact by a downward transposition on the closing of the roof in the end phase of the roof movement.

In addition to the main pillar, a main guidance bar can be associated with the vehicle between the roof and the car body for a problem-free and reliable roof movement. Its bearing lies in front of the main pillar in the direction of travel. The main guidance bar itself advances correspondingly forwardly on the roof movement, but can lie hidden predominantly within the clearance between the transversely outwardly disposed main pillars with a closed roof and can pivot through to the rear with respect to them. The main guidance bar and the main pillar can advantageously act on the roof in the manner of a pivot parallelogram.

It is in particular favorable in the roof movement for the main guidance bar to be held at a likewise movable bearing that can be co-transposed upwardly with respect to the closed position during a part of the roof opening movement. This transposition can, however, end with a reduced path with respect to the transposition of the main bearing of the main pillar; for example, the bearing of the main guidance bar and the bearing of the main pillar can be held at a common lever, for example a pivot lever, which is movable with respect to a main bearing fixed to the car body during the roof opening, which is simple in a technical control respect and is mechanically insensitive. With such a pivot lever, the main bearing of the main pillar is then further away from the pivot point of the pivot lever fixed to the car body than the bearing of the main guidance bar. The transposition path of the main bearing is thus larger than that of the bearing of the main guidance bar.

An auxiliary transmission controllable by a drive can moreover ensure a low force effort for the upward transposition of at least the bearing of the main pillar. A separate drive for the additional transposition, which is superimposed on the pivot movement, can then be omitted.

The movement of the bearing of the main pillar is particularly simplified when the former is disposed in the same position in the open roof position as in the closed roof position and the additional transposition component is only effective during the roof movement. The roof construction and the end positions of the roof can then remain unchanged with respect to a pure pivoting around a fixed bearing. An obstacle avoidance is nevertheless made possible in the movement.

This obstacle avoidance advantageously starts as the roof opening begins and is compulsorily coupled thereto. Separate control means for the additional movement component of the bearing or bearings can then be omitted.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
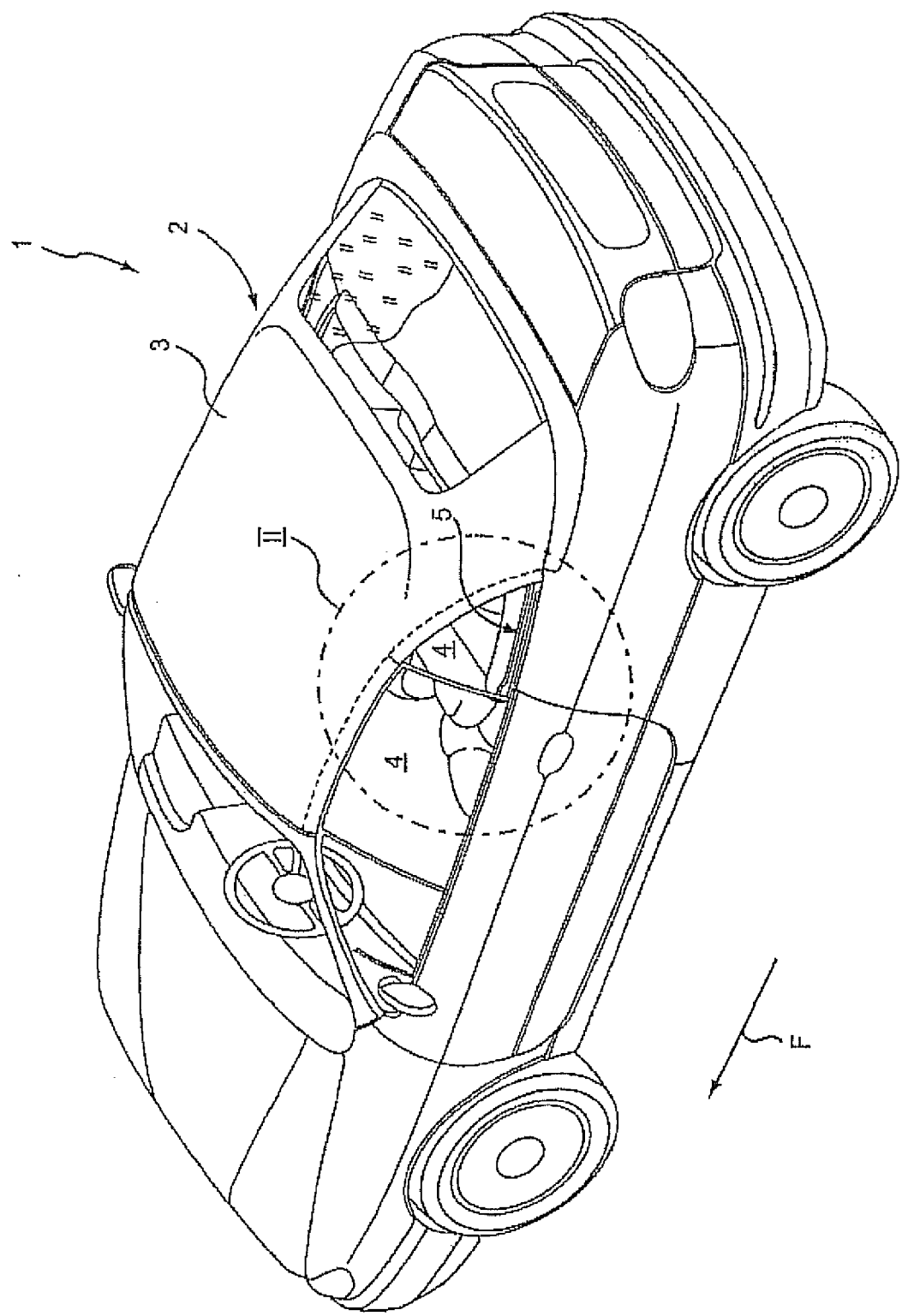
FIG. 1 is a perspective view of a convertible vehicle in accordance with the invention obliquely from behind with a closed roof.

Referring to the figures, a convertible vehicle in accordance with the invention is indicated at 1. The vehicle 1 includes a roof 2. The roof 2 includes an outer cover 3. The roof includes a rear window. The roof may also be a hybrid type roof with a combination of a partial cover and rigid roof parts. The roof shape can also vary and can, for example, provide rearwardly running out lateral fins or separate frames above side windows 4. A sliding region or deployment region can also be provided inside the roof 2.

The roof 2 includes a main pillar 6 at each transverse side of the vehicle 1 which represents a connector for the roof movement, which starts in the region at or beneath a side window breast line 5 and extends upwardly—frequently with an additional component in the direction of travel F—with a closed roof 2.

This main pillar 6 is pivotably coupled at a second pivot or bearing 7 disposed beneath the window breast line 5 with a closed roof 2. The bearing 7 is coupled to the car body by a movable connector 8, which is in turn movable—pivotable in the illustrated embodiment—about a first pivot or main bearing 9 fixed to the car body. A displacement of the bearing 7 in a line or the arrangement of the bearing 7 at a piston cylinder, which can be moved out separately during the roof opening, or another movement possibility would also be possible as an alternative to its arrangement on the pivoting movable connector 8. In every case, the bearing 7 can be raised during the roof opening or closing from its rest position located on the auxiliary line H1 with an upwardly directed movement component.

The main pillar 6 extends upwardly up to and into the approximately horizontal region of the roof 2. At least one further lateral roof frame 10 extending the roof 2 toward the front can be movably held there at the main pillar 6.

The main pillar 6 can moreover be provided at its edge at the front in the direction of travel with a sealing line, not drawn in any more detail here, with respect to the side windows 4 and include point-like or linear connections for the cover material 3.

In addition to the main pillar 6, a main guidance bar 11 is provided here as a further connector for the roof support and roof movement which likewise extends between the window breast line 5 and the upper horizontal region of the roof 2. This main guidance bar 11 is held at a bearing 12 which can likewise be held movably with respect to the car body. In the embodiment drawn here, the bearing 12 is held together with the bearing 7 at the movable connector 8 and can thus be raised out of its rest position disposed on the auxiliary line H2 with an upwardly directed component on its pivoting around the main bearing 9 fixed to the car body.

The main pillar 6 and the main guidance bar 11 act on the roof 2 in the manner of a pivot parallelogram that likewise initially opens on the opening of the roof.

A drive, a hydraulic cylinder 13 here, is provided at each side for the roof movement and acts via a linkage or power-amplifying and power-redirecting auxiliary transmission 14 on the main pillar 6 in two movement senses, namely in a rotating manner, on the one hand, and in a lifting manner, on the other hand. The transmission 14 includes a pair of connectors 16, 17. The connectors 16, 17 are pivotally coupled to each other at a third pivot or joint 18. The connectors 16, 17 extend between the moving bearing 7 and a fourth pivot or bearing 15 fixed to the car body. The connectors 16, 17 are at a generally oblique angle to one another in the joint 18 to the right of the connection line V1 between the bearings 7, 15 with a closed roof 2, moving into a substantially straight-line parallel position with respect to one another on the connection line V1 during the roof opening, and pivoting through to the other side of this line V1 in the further movement and then being angled to one another there at a reflex angle. The extension of the connectors 16, 17 with respect to one another during the movement causing a raising of the bearing 7 so that it is disposed upwardly with respect to its rest position on the auxiliary line H1 during a part of the movement of the roof 2.

Figure 2:
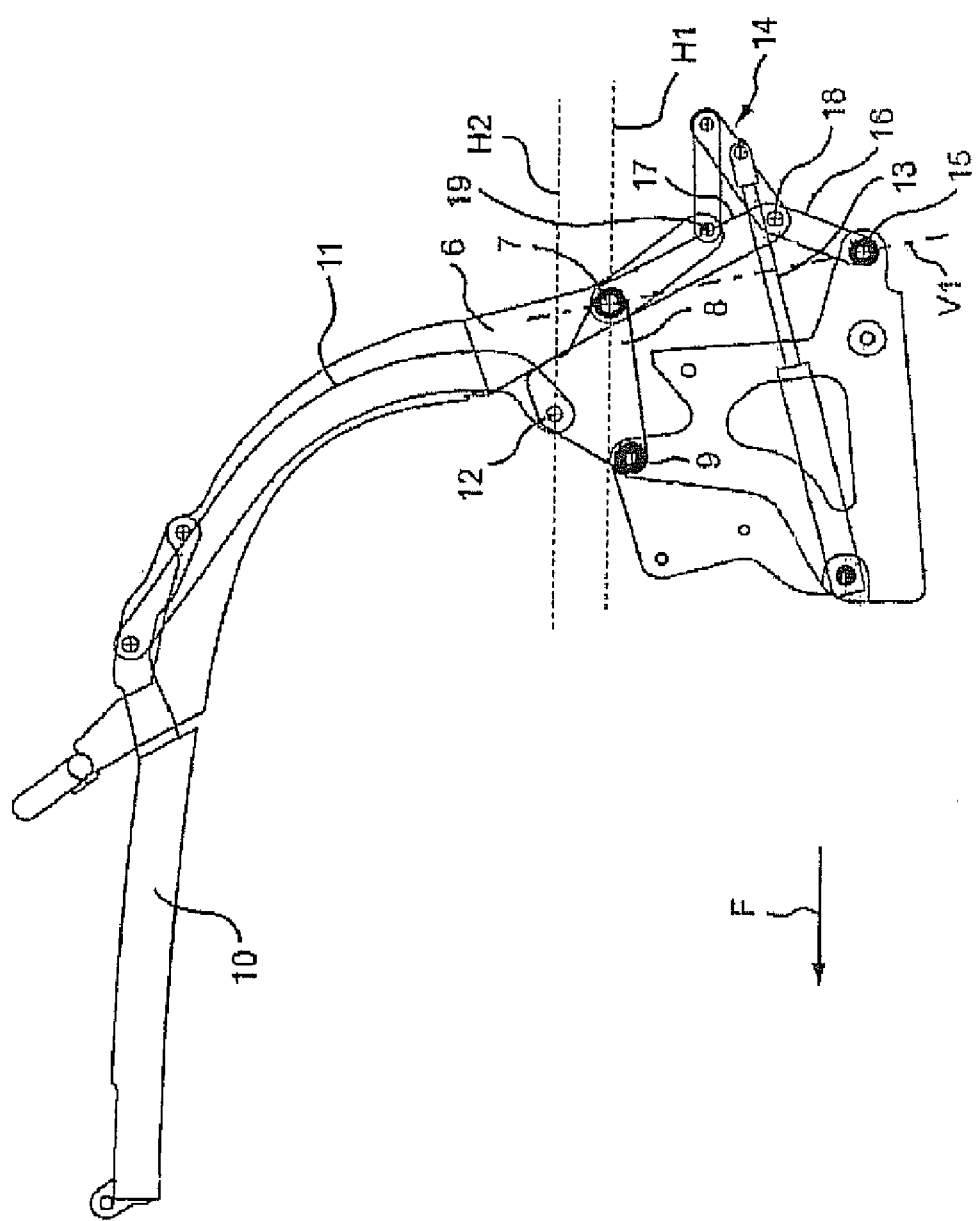
FIG. 2 is a separately drawn individual representation, for instance, of the detail II in FIG. 1 in a lateral view without roof covering and with a transparent car body as well as with two additional drawn horizontal auxiliary lines for the position of the bearings of the main pillar and the main guidance bar with a closed roof.
Figure 3:
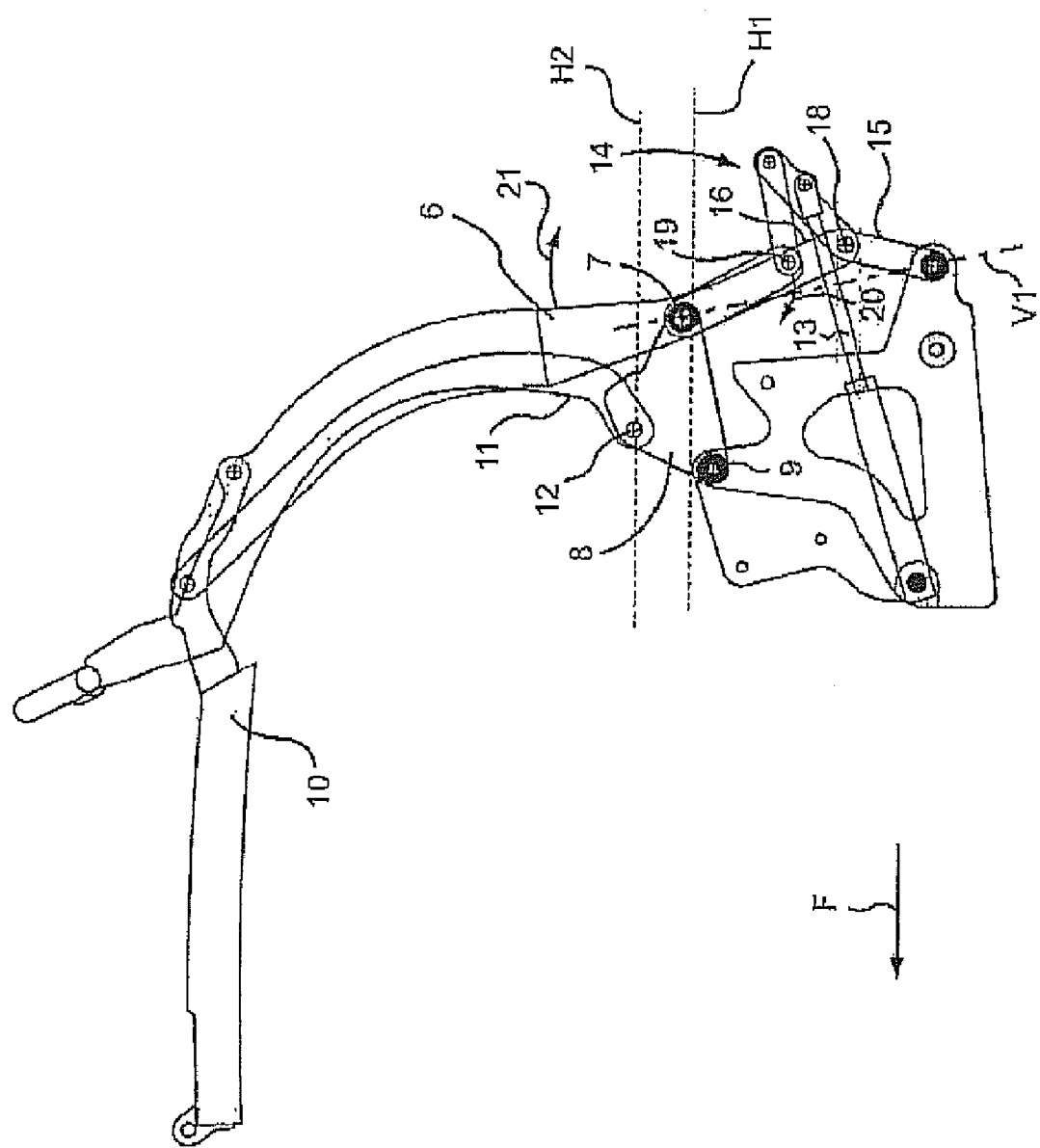
FIG. 3 is a similar view to FIG. 2 with a beginning roof opening by pulling in of a drive member and a force effect on the main pillar and a lever pivotable around a fixed main bearing.
Figure 4:
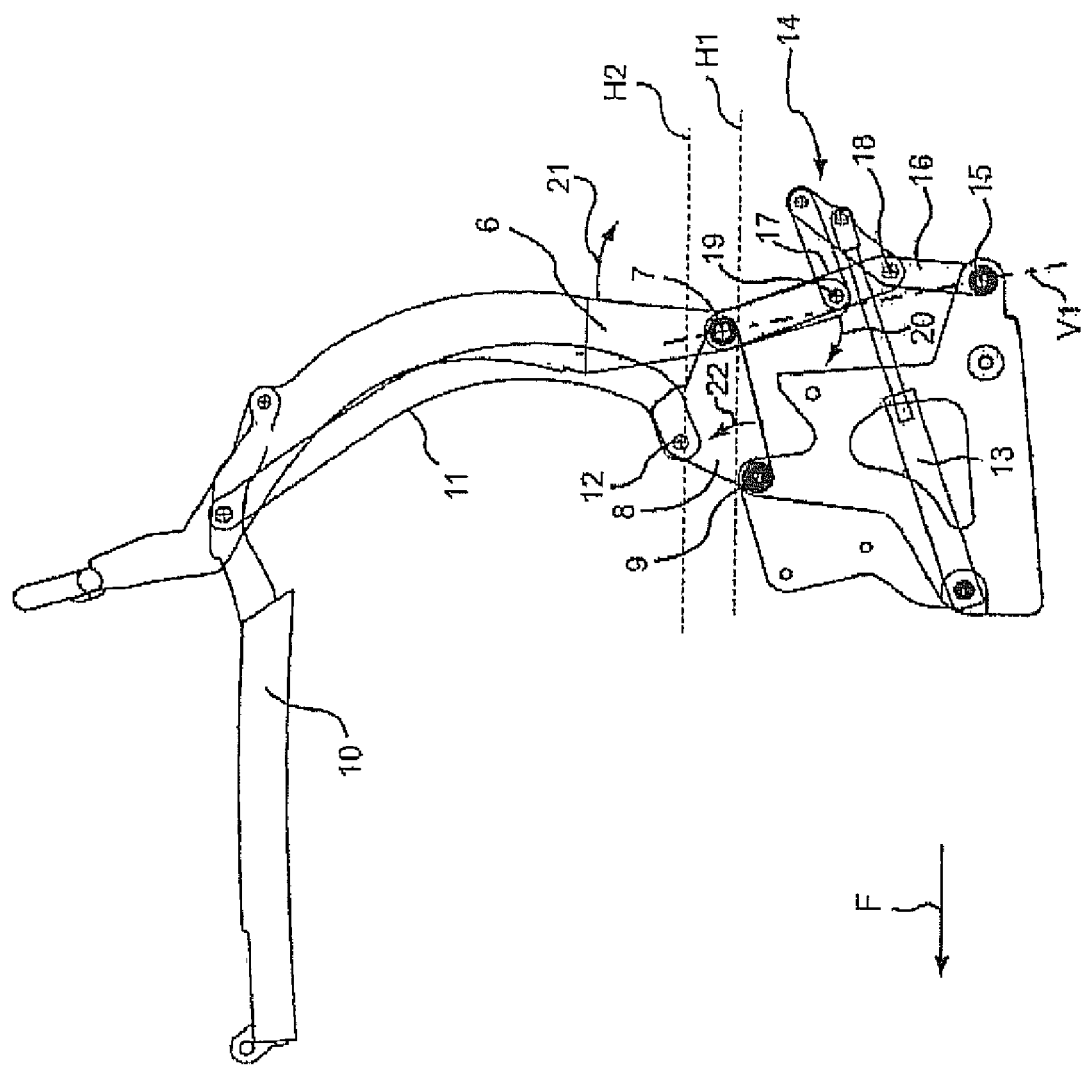
FIGS. 4 to 11 show the further course of the progressing roof opening in a similar view as in FIG. 3.
Figure 5:
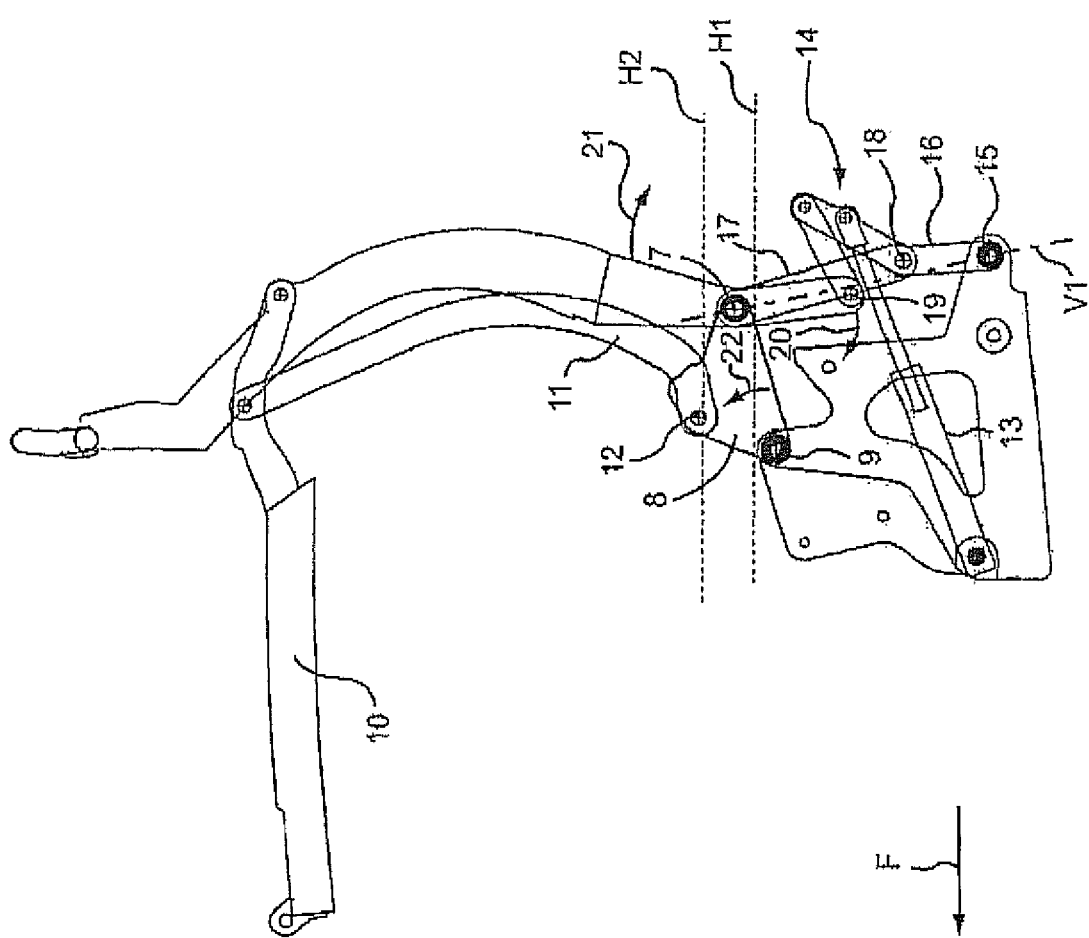

In order to open the roof 2 from the closed position in accordance with FIG. 2, the cylinder piston of the drive member 13 is moved in so that the angle enlarging already described starts in the joint 18 between the connectors 16, 17 via the auxiliary transmission 14 and a raising of the bearing arranged at the connector 17 thereby takes place directly as the opening of the roof begins (transition from FIG. 2 to FIG. 3) in a compulsory manner and without further control members. At the same time, the end 19 of the main pillar 6 projecting downwardly over the bearing 7 is transposed to the front in the direction of the arrow 20 with a component in the direction of travel F so that the pivoting of the main pillar 6 around the bearing position 7 starts simultaneously in the direction of the arrow 21.

The pivoting movable connector 8 connected to the car body at the joint 9 is also pivoted in the direction of the arrow 22 by the upward transposition of the bearing 7 and also takes along the bearing 12 of the main guidance pillar 11 in this process so that this bearing is also transposed upwardly from the auxiliary line H2 with respect to the closed roof position on the starting of the roof opening. This upward transposition is smaller here than the upward transposition of the bearing 7 of the main guidance bar 6, but can ensure a particularly advantageous movement path of the roof 2 with its raising over obstacles.

Figure 6:
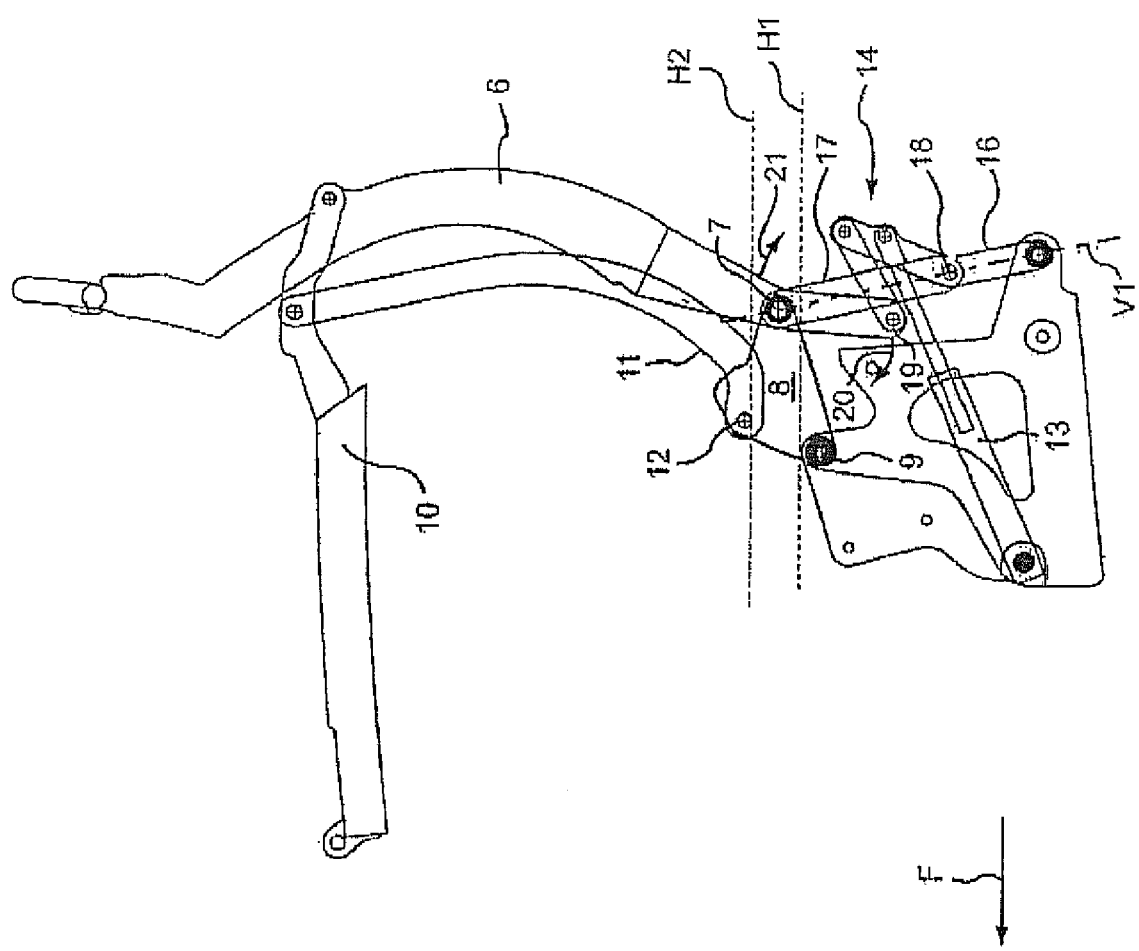
Figure 7:
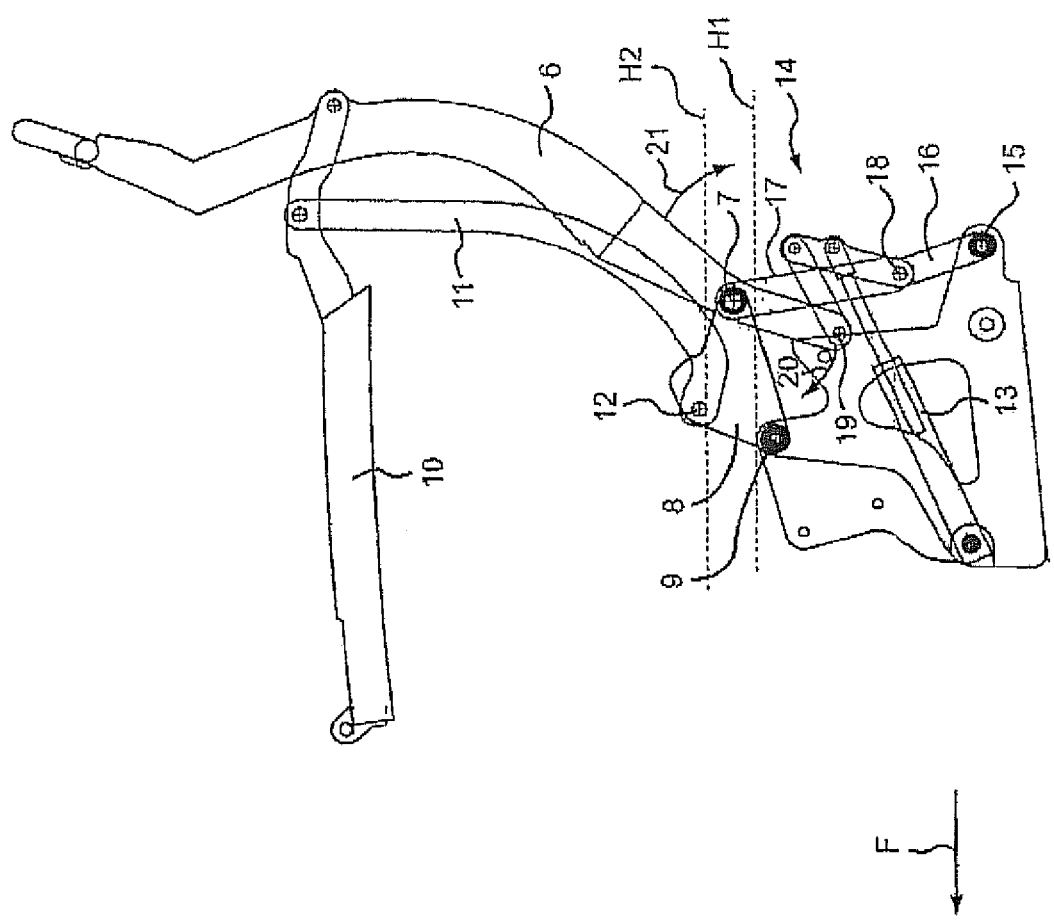
Figure 8:
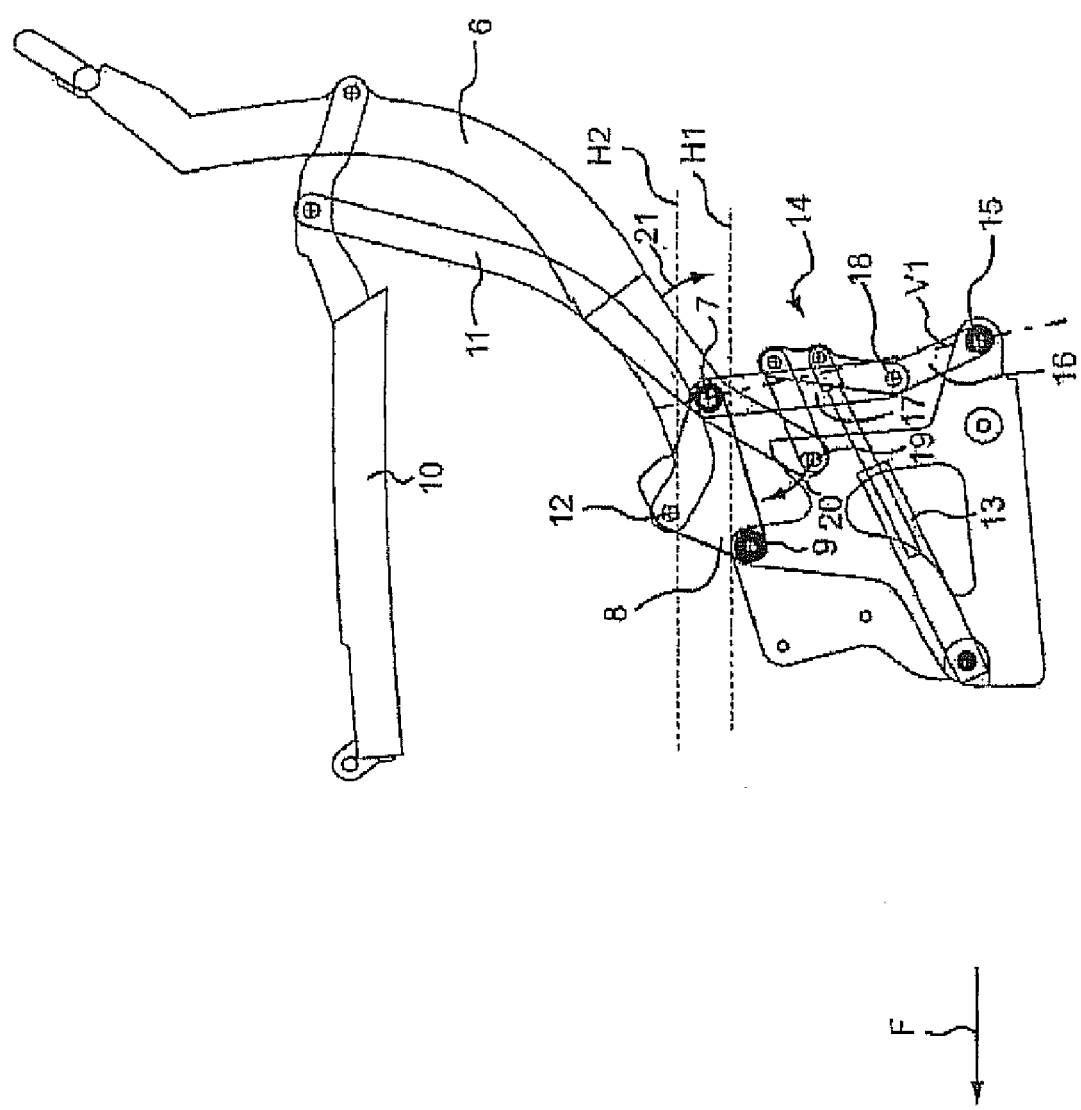
Figure 9:
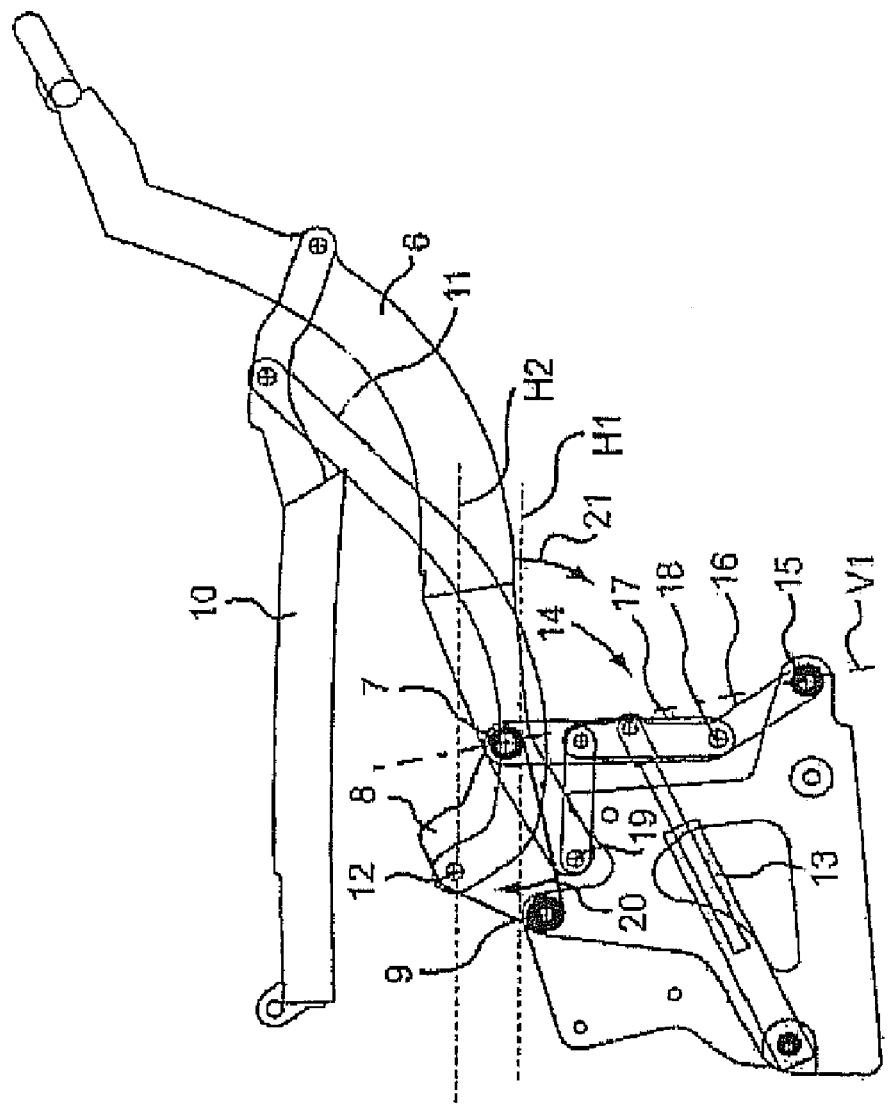
Figure 10:
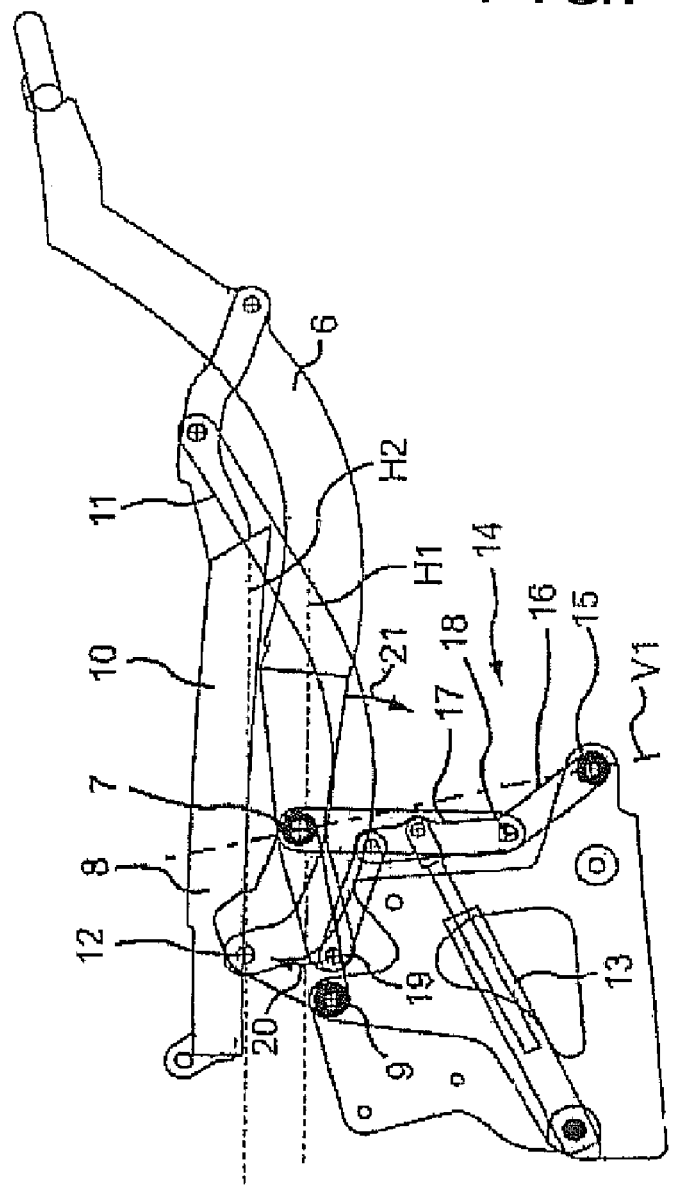
Figure 11:
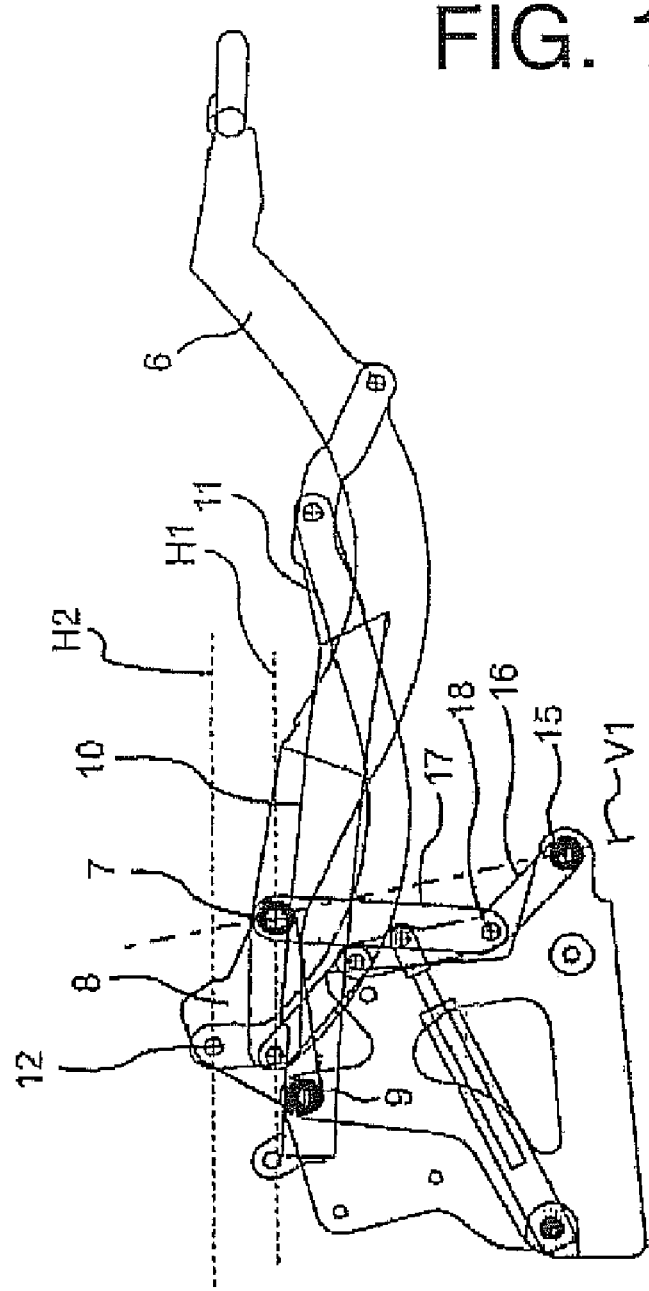

In the position in accordance with FIG. 6, the connectors 16 and 17 are in their extended 180° position with respect to one another, whereby the bearing 7 held at the connector 17—like the bearing 12—reaches its highest point within the movement here and falls again from there on before coming to lie at the starting height again, indicated by the auxiliary line H1, with an open roof (FIG. 11). With a fully closed or fully open roof 2, the positions of the bearings 7 and 12 are the same in each case, as would also correspond to bearings fixed to the car body. The upward transposition of the bearings 7, 12 therefore only takes place with an ongoing movement.

Figure 12:
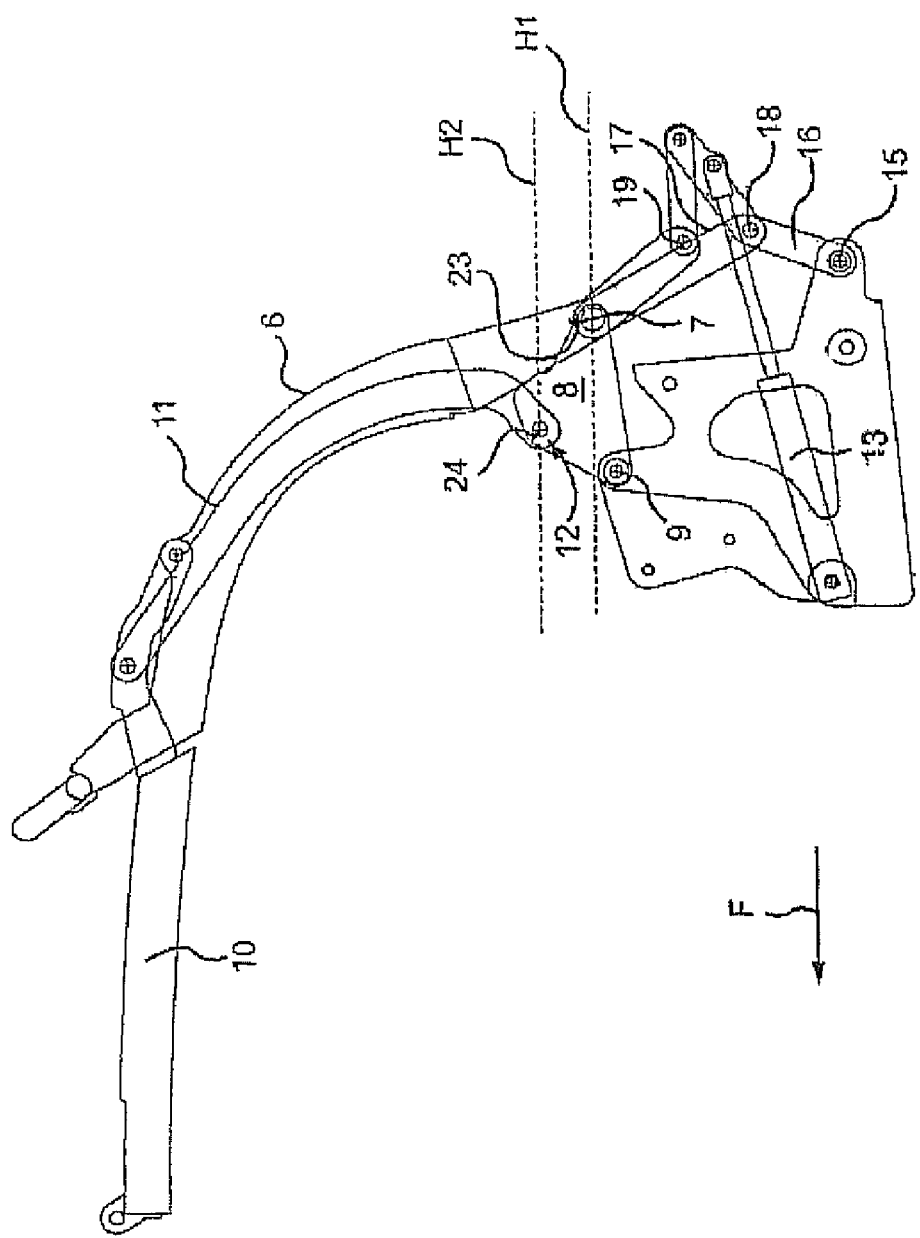
FIG. 12 is a similar view as FIG. 2 with additionally drawn in paths of the bearings of the main pillar and the main guidance bar during the roof opening movement.
Figure 13:
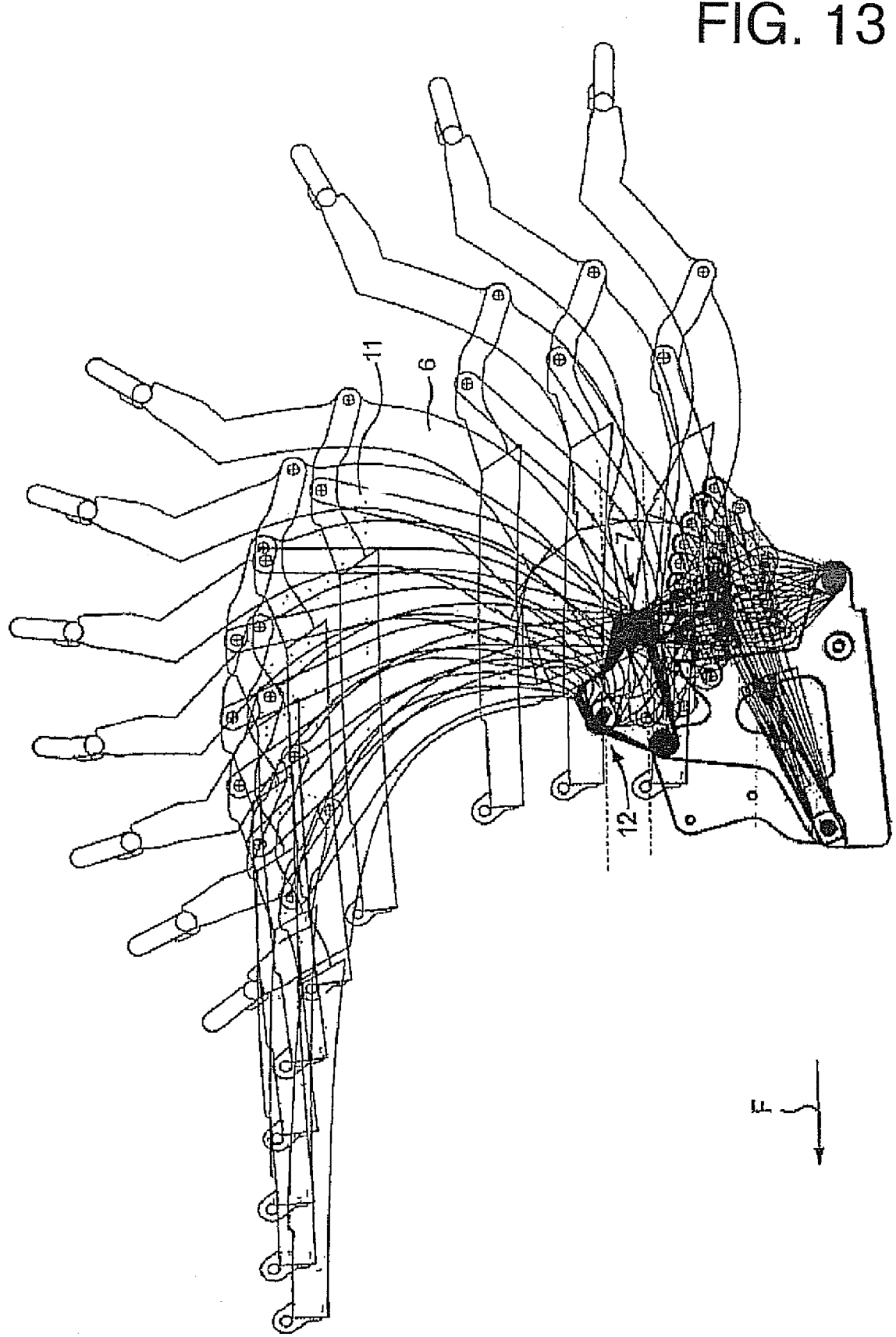
FIG. 13 is a superimposition of the views from FIGS. 2 to 11 during the roof opening or closing.

On the opening and closing of the roof, the same paths are again run through in each case by both movable bearings 7, 12, only in opposite directions. These paths 23, 24 are indicated in FIG. 12 and can also be recognized in the superimposed representation of the total movement in accordance with FIG. 13.

The stowage movement is thus in every case a superimposed movement with a pivot component around the bearing 7 and with its upward and downward movement with translatory and rotational portions. The bearing 7 per se also does not have to be a purely pivot bearing.

The total movable roof 2 can be tested as to its function before installation in the body; the modular unit installed in a finished manner in this way can then be delivered to the carcass and installed.

The invention can moreover be used both with vehicles having roofs to be moved fully automatically or partly automatically, as shown here, and with a manual movability of the roof 2.

The invention has been described in an illustrative manner. It is, therefore, to be understood that the terminology used is intended to be in the nature of the words of description rather than of limitation. Many modifications and variations of the invention are possible in light of the above teachings. For example, the invention as described herein is applicable to vehicles having a single row of seats, as well as vehicles having multiple rows of seats. Thus, within the scope of the appended claims, the invention may be practiced other than as specifically described.

We claim:

1. A convertible vehicle comprising a moving roof that includes a main pillar which projects upwardly from a window breast line when the roof is in a closed position, the main pillar being movable rearwardly and downwardly around a bearing on the opening of the roof, characterized in that the bearing is transposed upwardly with respect to the closed position at least during a part of the roof opening movement.

2. A convertible vehicle in accordance with claim 1, characterized in that the main pillar is provided with a sealing line for the sealing of the closed roof with respect to lateral windows.

3. A convertible vehicle in accordance with claim 1 including a main guidance bar between the roof and the car body is associated with the vehicle in addition to the main pillar.

4. A convertible vehicle in accordance with claim 3, characterized in that the main guidance bar is held at a bearing that is transposed upwardly with respect to the closed position at least during a part of the roof opening movement.

5. A convertible vehicle in accordance with claim 4, characterized in that the bearing of the main guidance bar and the bearing of the main column are held at a common lever which is movable with respect to a main bearing fixed to the car body during the roof opening.

6. A convertible vehicle in accordance with claim 5, characterized in that the common lever is pivotally movable with respect to the main bearing.

7. A convertible vehicle in accordance with claim 3 including the main guidance bar and the main pillar act on the roof in the manner of a pivot parallelogram.

8. A convertible vehicle in accordance with claim 1 including the upward transposition of at least the bearing of the main pillar may be effected by means of an auxiliary transmission controllable via a drive.

9. A convertible vehicle in accordance with claim 1 including the bearing of the main pillar is disposed in the same position in the open roof position as in the closed roof position.

10. A convertible vehicle in accordance with claim 9, characterized in that the bearing of the main guidance bar is disposed in the same position in the open roof position as in the closed roof position.

11. A convertible vehicle in accordance with claim 1 including the upward transposition of the bearing or bearings starts as the roof opening begins and is coupled therewith in a compulsory manner.

12. A convertible vehicle in accordance with claim 1 including the same path(s) is/are run through by the bearing or bearings in opposite directions on the closing of the roof.

13. A convertible vehicle comprising:

a body having a passenger compartment; and a roof movable between a closed position extending over the passenger compartment in the vehicle and an open position retracted in a storage space located adjacent the passenger compartment, the roof comprising:

a cover;

a movable connector coupled to the body of the vehicle for movement about a first pivot;

a main pillar supporting at least a portion of the cover, the main pillar being pivotally coupled to the pivot lever at a second pivot, the second pivot being towards a lower end of the main pillar when the roof is in the closed position, the pivot lever and main pillar being movable about the respective first and second pivots during displacement of the roof between the closed position and the open position; and a linkage operatively coupled between the movable connector and the body of the vehicle to cause the second pivot to be moved upwardly as the roof moves between the closed position and the open position, the second pivot reaching a highest position while the roof is between the closed position and the open position.

14. A convertible vehicle as set forth in claim 13, wherein the linkage includes a pair of connectors pivotally coupled to each other at a third pivot, one connector of the pair of connectors being pivotally coupled to the movable connector at the second pivot and the other connector of the pair of connectors being pivotally coupled to the body at a fourth pivot.

15. A convertible vehicle as set forth in claim 14, wherein the second pivot reaches the highest position when the third pivot is disposed along an overcenter line extending between the second pivot and the fourth pivot.

16. A convertible vehicle as set forth in claim 15 including a pair of links pivotally coupled to each other and interconnecting the main pillar to the linkage.

17. A convertible vehicle as set forth in claim 16, wherein the main pillar includes an upper portion that supports the at least a portion of the cover and a lower portion that extends from an opposite side of the second pivot relative to the upper portion.

18. A convertible vehicle as set forth in claim 17, wherein one of the links of the pair of links is pivotally coupled to the lower portion of the main pillar and the other of the pair of links is pivotally coupled to the third pivot.

19. A convertible vehicle as set forth in claim 18 including an actuator coupled to one of the pair of links for driving the roof between the closed position and the open position.

* * * * *